Figure 1:
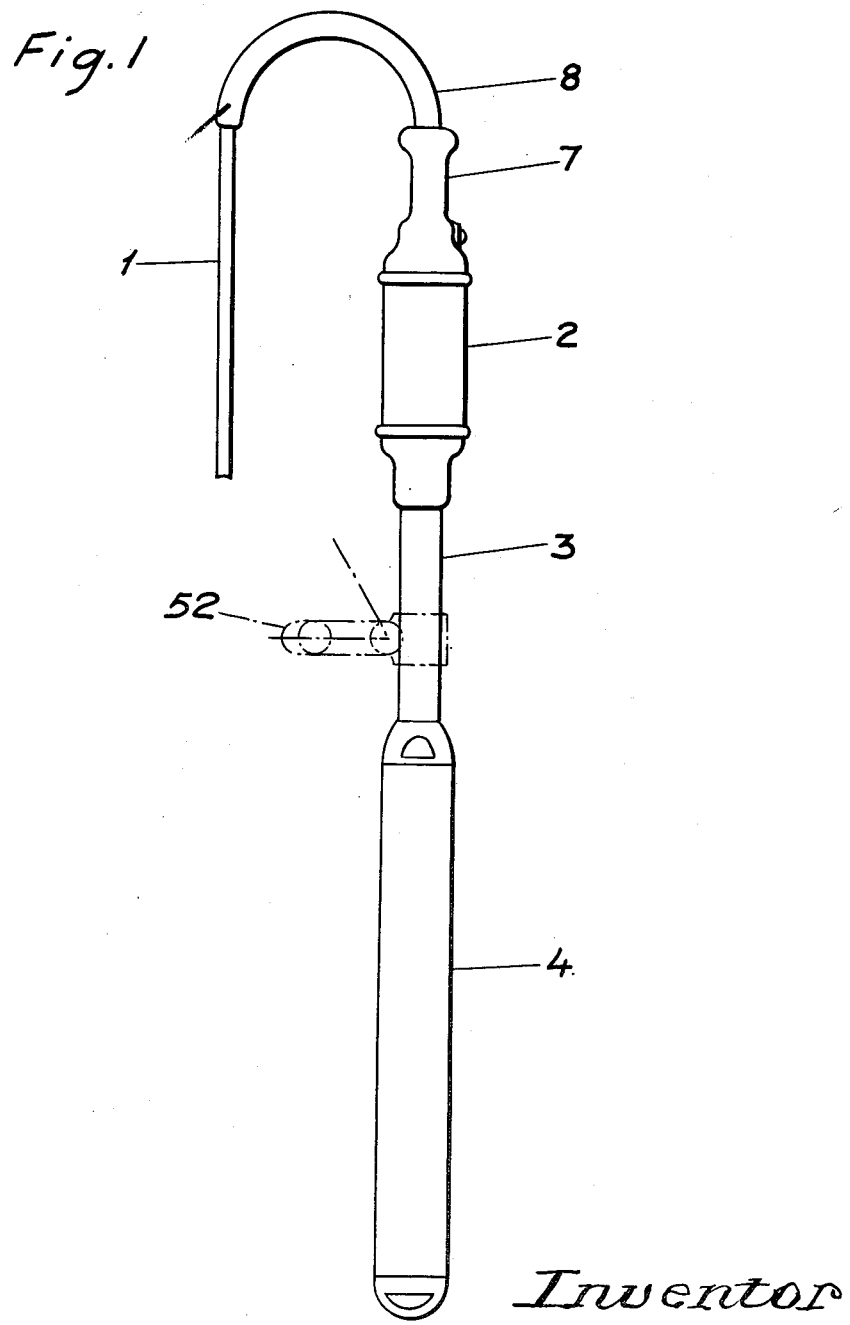

May 20, 1952      K. V. LINDKVIST      2,597,505
TUBE VIBRATOR

Filed Oct. 3, 1950

Inventor
K. V. Lindkvist

May 20, 1952  K. V. LINDKVIST  2,597,505
TUBE VIBRATOR

Filed Oct. 3, 1950  3 Sheets-Sheet 2

Inventor
K. V. Lindkvist

May 20, 1952 K. V. LINDKVIST 2,597,505
TUBE VIBRATOR

Filed Oct. 3, 1950 3 Sheets-Sheet 3

Inventor
K. V. Lindkvist
By Glascock Downing Diebold
Attys.

Patented May 20, 1952

2,597,505

UNITED STATES PATENT OFFICE 2,597,505

TUBE VIBRATOR

Knut V. Lindkvist, Stockholm, Sweden

Application October 3, 1950, Serial No. 188,216
In Sweden November 21, 1945

2 Claims. (Cl. 259—1)

The present invention relates to a tube vibrator for the generation of high frequency vibrations—higher than 100 Hz, i. e. 6000 vibrations/minute—for the compression of plastic materials, particularly concrete, comprising a cylindrical casing enclosing one, or several superposed rotating impulse members generating the vibrations, said impulse members consisting of weights arranged eccentrically in relation to the axis of rotation.

Generally, a tube vibrator is a handtool for vibrating material in deep moulds having very often a small width but a great extension in the longitudinal direction where vibrators of other types generally cannot be used, and is in the course of the work, usually displaced in the vertical direction at each new insertion in the material and also in the lateral direction between all insertions. Thus, the vibrator performs a discontinuous displacement movement.

In addition to possessing certain qualifications from the viewpoint of manufacture and working economy, a good tube vibrator and its drive device should satisfy the following practical and constructional viewpoints:

(1) The vibration frequency must be higher than 100 Hz, in order to obtain a good output of work.

(2) The vibrator and its drive device must have a low weight, it must be easy to operate, and it must possess a long life and be reliable in operation.

(3) The diameter of the vibrator must be as small as possible.

Tube vibrators have hitherto been operated by short-circuited alternating current motors driven with a frequency of 50 cycles per second and reaching a speed of max. about 2850 R. P. M., internal combustion engines having a speed of max. about 3000 R. P. M., or pneumatic engines having a speed of max. about 4000 R. P. M.

In order to generate vibrations having a frequency of more than 100 Hz, it has been necessary either to connect a gearing-up device between the source of power and the impulse member, or to use a conical pendulum, the casing of which is during certain conditions subjected to vibrations of a considerably higher frequency than the rotational speed of the pendulum in revolutions/second. This has met with great practical and constructional difficulties. A toothed wheel gearing device cannot be accommodated in the tube, and if the drive source and the gear device are placed separated from the tube vibrator and connected by means of a long, flexible shaft, it is difficult to manipulate the shaft which will be quickly worn due to the high speed. Furthermore, the mounting and articulation of the conical pendulum are details which often do not stand the heavy stresses to which they are subjected.

The difficulties mentioned above are eliminated by using the tube vibrator according to the present invention and at the same time the demands stated above are satisfied.

The invention may be realized by driving the tube vibrator by means of a direct connected, very fast moving, short-circuited alternating current motor which is fed through a long, electric cable with low tension high frequency current (about 65 volts, and more than 105 cycles/sec. respectively) from a motor generator or a generator connected with any other source of power, said current emitters being preferably transportable. By this it is possible to drive the impulse members of the tube vibrator with a rotational speed which is higher than 100 revolutions/second. The alternating current motor may be a single phase motor or a universal motor which can operate with direct current as well as with alternating current ($n$~10,000 revolutions/minute).

Figure 8:
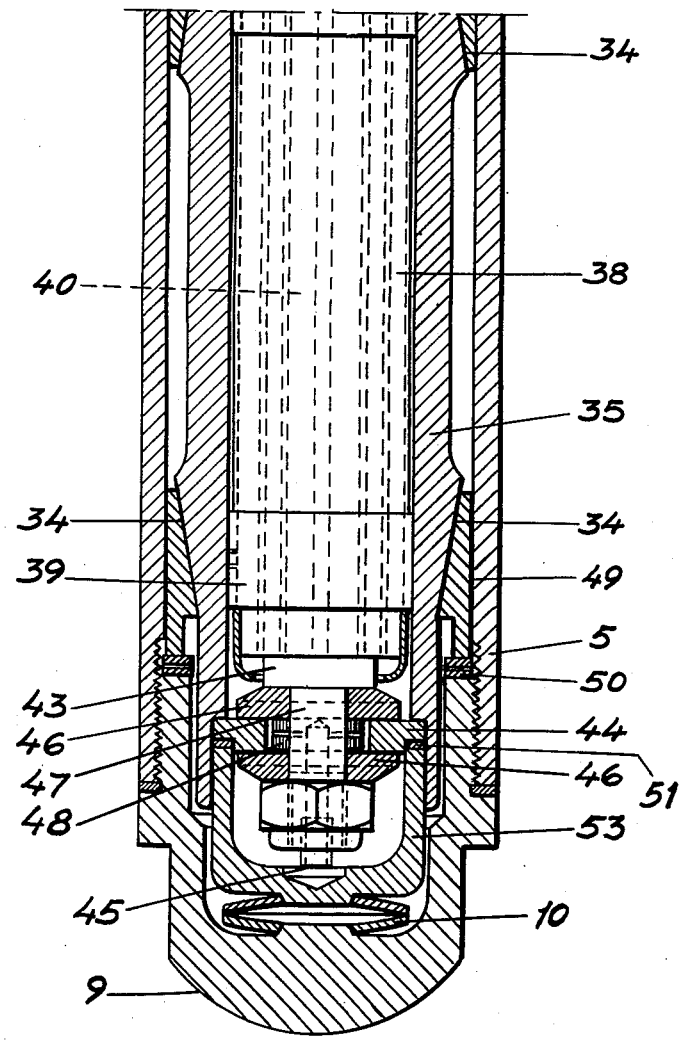

The invention is illustrated in the accompanying drawing, in which:

Fig. 1 is a side view of the tube vibrator and its drive device,

Fig. 2 is a longitudinal section through one embodiment of the vibrator, in which the impulse members are journaled in a number of ball bearings, Fig. 3 is a longitudinal section through another embodiment, which is provided with slide bearings, Fig. 4 shows a section along the line IV—IV in Fig. 2, Fig. 5 is a section through a detail, Fig. 6 is a section through a modified detail, Fig. 7 is a section along the line VII—VII in Fig. 3, and Fig. 8 shows the lower portion of Fig. 3 on a larger scale.

A casing 2 surrounds a very fast moving, short-circuited alternating current motor which is fed with low tension high frequency current through an electric cable 1 provided with a reinforcement 8 and with a contact plug which is built in a special manner and at the same time serves as a cover for the motor casing 2. The vibrator 4 communicates with the motor casing by means of an intermediate portion 3 which is relatively resistant to bending but yet elastic, said intermediate portion having for its object to prevent the transmission of the vibrations of the vibrator to the motor as well as to the adjustable handle 52 which, when required, may be applied around the intermediate portion 3. The motion of the motor is transmitted to the shaft 21, 37 of the vibrator by means of the flexible shaft 6, the drive pin 26 and the connecting sleeve 27. The flexible shaft is mounted in the usual manner is a coiled wear lining 28 which is pressed into a stiffening yet somewhat ductible protective spring 29 which, in its turn, is protected by the preferably oil-proof intermediate portion 3 of synthetic rubber or the like. The wear lining and the protective spring extend through and are retained by a partially slit sleeve 30 which is screwed into the upper part of the casing 5 of the vibrator. The sleeve 30 is retained in its position by the lock nut 31 and is provided with a lubricating chamber 32 for the lubrication of the ductible shaft and its wear lining.

In the embodiment of the vibrator according to Fig. 2 the impulse members of the vibrator are divided into two aggregates 11, 12$_{1-2}$, and 11, 12$_{3-4}$ respectively, which together with the bearing sleeves 13 can successively be pushed into the casing 5, fitted in each other, and thereafter held in a resiliently clamped position by means of two spring washers 10 and the end plug 9. A compression spring located above the elements and exerting a downward pressure may be used instead of the spring washers. Each impulse member consists of a weight 11 arranged eccentrically in relation to the axis of rotation, and is mounted in two ball bearings 12$_1$, 12$_2$ and 12$_3$, 12$_4$ respectively, which are inserted in a light bearing sleeve 13. The respective conical surfaces of the two bearing sleeves are guided and centered by an upper sleeve 14, a central distance sleeve 16 and a lower clamp bonnet 17 serving as oiler and centering at the same time the two spring washers 10. Around the opposed ends 25 of the two eccentric weights 11 there is, furthermore, provided a connecting sleeve 24 transmitting the rotary motion from the upper to the lower eccentric weight. The lubrication of the fast moving ball bearings is effected thereby that a propeller 19 fixed on the pin 18 of the lower eccentric weight presses oil from the oiler of the clamp bonnet 17 through the bearing 12$_4$ where the oil is thrown by the centrifugal force against the ascending groove 20 of the lower bearing sleeve and is conveyed further upwards in the form of mist. In order to obtain a reliable lubrication all the way up to the shaft 21, an oil supply channel 23 is provided in the sleeve 14. The oil is returned through descending groove 22.

In the second embodiment of the vibrator according to Fig. 3 the vibrator casing 5 is on its inside provided with a shoulder 33 for an outwardly cylindrical but inwardly conical guide sleeve 34 providing a guide for a long slide bearing sleeve 35 which in its upper portion is provided with a nipple 36 for guiding and centering the shaft 37.

Said shaft 37 is rigidly connected with the externally cylindrical rotor 38 which is acting as an eccentric weight and provided with two slide bearing surfaces 39 running against the slide bearing sleeve 35. The rotor acts as an eccentric weight thereby that its one half cross section has been provided with a number of holes 40 which are parallel with the rotor shaft (Fig. 6), or thereby that the whole cross section has been provided with symmetrically arranged axial holes 40, 41 (Fig. 5). The holes 41 on the one half cross section are filled with a heavy metal. The holes 40 communicate by means of radial holes 42 with the slide bearing surfaces 39, so that the oil which has been filled into the holes 40, during operation is by degrees pressed out to the slide bearing surfaces. In order to still more improve the lubrication, an oilsealing cover 43 provided with holes has been arranged at each end of the rotor, said covers catching oil passing through the space between the rotor shaft and the holes of the covers, and retaining it until the pressure increased by the centrifugal force conveys it further through the holes 40, 42 to the slide bearing surfaces 39 so that an effective circulating lubrication is obtained.

In order to absorb axial forces which may arise, the rotor 38 is elongated in the downward direction by means of a pin 47 inserted in a double-acting axial slide bearing 44 obtaining oil from a hole 45 in the pin guiding the two bearing washers 46 which are arranged with suitable play relatively to the bearing 44 by means of distance sleeve 48 provided with lubricating grooves. It is of great importance for the efficiency and the life of this embodiment that a first rate lubricating oil with a low viscosity coefficient is used and that the heat developed in the bearings is carried off by providing a plurality of good contact surfaces. Such contact surfaces are provided at the guide sleeves 34, 49, for example. The slide bearing sleeve 35 is between the guide sleeves 34, 39 fixed to its position within the vibrator casing 5 by means of the spring washers 10, a folded spring ring 50 compensating for inaccurate measures, an oil seal 51 and the clamp bonnet 53 by tightening the end plug 9.

The substantial features of the present invention are:

Each impulse member is composed of two or several parts 11, 12$_{1-4}$, 13 and 35, 38 respectively, arranged to be inserted and fitted in each other in the vibrator casing 5 and to be guided and centered by sleeves 14, 16, 17 and 34, 49, 53 respectively, which are adapted to be pushed on to the parts forming the impulse member, one of the sleeves 17, and 53 respectively, being arranged in the lower portion of the vibrator casing 5 and formed as an oiler for the supply of oil to the rotary parts, and to be held in a resiliently clamped position against the parts enclosed in the casing by means of spring washers 10 by tightening an end plug 9 closing up the vibrator casing.

Each impulse member consists of a cylindrical rotor 38 with two slide bearing surfaces 39 running against a slide bearing sleeve 35 inserted and fixed in the vibrator casing 5, said rotor being provided with a number of preferably symmetrically placed holes 40, 41, which are parallel with the rotor shaft, the holes 41 on the one half on the cross section being filled with heavy metal and the other holes 40 with oil.

An oil-catching, perforated cover 43 is placed at each end of the rotor 38.

The rotor 38 is elongated in the downward direction by means of a pin 47 inserted in a double-acting axial slide bearing 44 which obtains oil through a hole in the pin 47 guiding the two bearing washers 46 which, in their turn, are arranged with suitable play in relation to the bearing 44 by means of a distance sleeve 48 provided with lubricating grooves.

Contact surfaces for carrying off heat from the slide bearing surfaces 39 are arranged between the guide sleeves 34, 49 and the slide bearing sleeve 35, on the one hand, and the vibrator casing 5, on the other hand.

It is evident that by combining two or more of the abovementioned features it is possible to obtain a great number of different embodiments for special purposes which, provided they are based on the main principle of the invention, must be considered to fall within the scope of the invention.

Having now described my invention, what I claim as new and desire to secure by Letters Patent is:

1. A tubular vibrator for the production of high-frequency mechanical vibrations of frequencies greater than 100 per second, and adapted for the compression of plastic material such as concrete, comprising a cylindrical outer casing, an inner removable wear lining in said casing, at least one eccentrically loaded impulse member disposed for rotation within said wear lining, and means for securing said wear lining in proper lengthwise position in said casing, said last named means comprising an end plug secured to one end of said casing, an oil cup within said end plug, and means defining passages for lubricating oil extending from said oil cup and in communication with the inner surface of said wear lining.

2. A tubular vibrator in accordance with claim 1, in which there are two impulse members disposed successively in the longitudinal direction of the casing.

KNUT V. LINDKVIST.

REFERENCES CITED

The following references are of record in the file of this patent:

UNITED STATES PATENTS

| Number | Name | Date |
|---|---|---|
| 2,148,765 | Mall | Feb. 28, 1939 |
| 2,167,987 | Mall | Aug. 1, 1939 |
| 2,284,090 | Hotchkiss | May 26, 1942 |
| 2,479,799 | Wilde | Aug. 23, 1949 |
| 2,492,431 | Kroeckel | Dec. 27, 1949 |